US010858516B2

(12) United States Patent
Rathore et al.

(10) Patent No.: US 10,858,516 B2
(45) Date of Patent: Dec. 8, 2020

(54) SILSESQUIOXANE POLYMERS, COMPOSITIONS, AND ARTICLES

(71) Applicant: 3M INNOVATIVE PROPERTIES COMPANY, St. Paul, MN (US)

(72) Inventors: Jitendra S. Rathore, Woodbury, MN (US); Ramesh C. Kumar, Woodbury, MN (US); Chetan P. Jariwala, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 16/643,727

(22) PCT Filed: Sep. 13, 2018

(86) PCT No.: PCT/IB2018/057027
§ 371 (c)(1),
(2) Date: Mar. 2, 2020

(87) PCT Pub. No.: WO2019/058232
PCT Pub. Date: Mar. 28, 2019

(65) Prior Publication Data
US 2020/0270457 A1    Aug. 27, 2020

Related U.S. Application Data

(60) Provisional application No. 62/561,903, filed on Sep. 22, 2017.

(51) Int. Cl.
| C08L 83/06 | (2006.01) |
| C09J 7/20 | (2018.01) |
| C09J 7/38 | (2018.01) |
| C08G 77/14 | (2006.01) |
| C08G 77/26 | (2006.01) |
| C08G 77/28 | (2006.01) |

(52) U.S. Cl.
CPC ............ *C08L 83/06* (2013.01); *C08G 77/14* (2013.01); *C08G 77/26* (2013.01); *C08G 77/28* (2013.01); *C09J 7/201* (2018.01); *C09J 7/38* (2018.01); *C09J 2483/005* (2013.01)

(58) Field of Classification Search
CPC . C08L 83/00; C07F 7/18; B32B 25/20; C09D 183/04
See application file for complete search history.

(56) References Cited

U.S. PATENT DOCUMENTS

| 7,482,419 | B2 | 1/2009 | Caprasse |
| 9,273,163 | B2 | 3/2016 | Crowther |
| 9,453,109 | B2 | 9/2016 | Rathore |
| 9,463,584 | B2 | 10/2016 | Guha |
| 9,663,690 | B2 | 5/2017 | Chatterjee |
| 2007/0026226 | A1 | 2/2007 | Chen |
| 2009/0171014 | A1 | 7/2009 | Hergenrother |
| 2011/0301254 | A1 | 12/2011 | Knott |
| 2014/0088213 | A1 | 3/2014 | Kulkarni |
| 2015/0038037 | A1 | 2/2015 | Coppens |
| 2015/0090160 | A1 | 4/2015 | Taomoto |
| 2016/0024707 | A1 | 1/2016 | Aydin |
| 2016/0319156 | A1 | 11/2016 | Rathore |

FOREIGN PATENT DOCUMENTS

| CN |  | 103881099 | * | 6/2014 |
| JP |  | 2006-219570 |  | 8/2006 |
| JP |  | 2013-237825 |  | 11/2013 |
| WO | WO | 2013-162704 |  | 10/2013 |
| WO | WO | 2014-074372 |  | 5/2014 |
| WO | WO | 2014-099699 |  | 6/2014 |
| WO | WO | 2014-139931 |  | 9/2014 |
| WO | WO | 2016-133667 |  | 8/2016 |
| WO | WO | 2019-058228 |  | 3/2019 |
| WO | WO | 2019-058229 |  | 3/2019 |
| WO | WO | 2019-058231 |  | 3/2019 |

OTHER PUBLICATIONS

CN 10 388 1099 machine translation (2014).*
AATCC Test Method 22-1996, "Water Repellency: Spray Test", Technical Manual of the American Association of Textile Chemists and Colorists, 2001, pp. 63-65.
Clarson, "Siloxane Polymer—Table of contents", Prentice Hall: Englewood Cliffs, 1993, 9pages.
Encyclopedia of Polymer Science and Engineering, Wiley-Interscience Publishers, New York, 1988, vol. 13, 3pages.
(Continued)

Primary Examiner — Kuo Liang Peng
(74) Attorney, Agent, or Firm — Jean A. Lown

(57) ABSTRACT

A silsesquixane polymer, a composition including such silsesquixane polymer, and an article including such polymer or composition, wherein the composition includes a silsesquioxane polymer and a free siloxane; wherein the silsesquioxane polymer includes a three-dimensional network of Formula (I): wherein: each $R^1$ and $R^2$ is independently a (C1-C4)alkyl; each $L^1$ is independently a single bond, an alkylene, or an alkylene bonded to a group selected from oxy, thio, carbonyl, —NH—, and combinations thereof; each $R^3$ is independently a linear (C14-C100)alkyl; with the proviso that $L^1$ is selected such that each Si atom is directly bonded to an alkylene or an alkyl; m is an integer of at least 2; n is an integer of at least 1; m+n is an integer of at least 10; each oxygen atom at an asterisk (*) is bonded to another Si atom within the three-dimensional network; and the silsesquioxane polymer is a solid at 25° C.

(I)

$$(R^1)_3Si-O-\left[\begin{array}{c}R^3\\|\\L^1\\|\\Si-O\\|\\O\\|\\*\end{array}\right]_m\left[\begin{array}{c}R^1\\|\\Si-O\\|\\R^2\end{array}\right]_n Si(R^2)_3$$

20 Claims, 1 Drawing Sheet

(56) References Cited

OTHER PUBLICATIONS

Kirk-Othmer, Encyclopedia of Polymer Science and Engineering, Wiley-Interscience Publication, 1989, vol. 15, Ed.2, pp. 235-243.
Noll, "Chemistry and Technology of Silicones", Academic Press, 1960, pp. 585-595.
Tomanek, "Silicones and Industry: A Compendium for Practical Use, Instruction, and Reference", Munich, 1990, 4pages.
Wilkinson, "Comprehensive Organometallic Chemistry", Pergamon Press, New York 1982, vol. 2, pp. 329-330.
International Search report for PCT International Application No. PCT/IB2018/057027 dated Nov. 14, 2018, 5 pages.

\* cited by examiner

SILSESQUIOXANE POLYMERS, COMPOSITIONS, AND ARTICLES

CROSS REFERENCE TO RELATED APPLICATIONS

This application is a national stage filing under 35 U.S.C. 371 of PCT/IB2018/057027, filed Sep. 13, 2018, which claims the benefit of U.S. Provisional Patent Application No. 62/561,903, filed Sep. 22, 2017, the disclosure of which is incorporated by reference herein in its/their entirety.

BACKGROUND

A silsesquioxane is a compound with the empirical chemical formula $RSiO_{3/2}$ where Si is the element silicon, O is oxygen and R is an organic group. Silsesquioxane materials generally contain reactive silanol (Si—OH) moieties, which can condense over time or with the help of an acid/base catalyst leading to curing of the material. This curability of silsesquioxanes via silanol groups has been widely utilized to prepare solid films and patterns in photolithography. The presence of the silanol groups, however, can lead to materials having limited shelf-life and limited solubility. Also, the presence of residual acids or bases from curing mechanisms can cause corrosion. Thus, new silsesquioxane materials are desirable.

SUMMARY OF THE DISCLOSURE

The present disclosure provides silsesquioxane (SSQ) polymers, compositions including such polymers and free siloxanes, and articles including such SSQ polymers or compositions.

In one embodiment, the present disclosure provides a silsesquioxane polymer that includes a three-dimensional network of Formula (I):

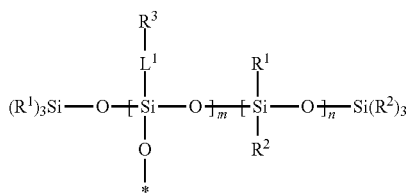

wherein:
each $R^1$ and $R^2$ is independently a (C1-C4)alkyl;
each $L^1$ is independently a single bond, an alkylene, or an alkylene bonded to a group selected from oxy, thio, carbonyl, —NH—, and combinations thereof;
each $R^3$ is independently a linear (C14-C100)alkyl;
with the proviso that L' is selected such that each Si atom is directly bonded to an alkylene or an alkyl;
m is an integer of at least 2;
n is an integer of at least 1;
m+n is an integer of at least 10;
each oxygen atom at an asterisk (*) is bonded to another Si atom within the three-dimensional network; and
the silsesquioxane polymer is a solid at 25° C.

In another embodiment, the present disclosure provides a composition including a silsesquioxane polymer and a free siloxane (which may or may not be polymeric); wherein the silsesquioxane polymer includes a three-dimensional network of Formula (I).

In another embodiment, an article is provided that includes: a substrate; and a silsesquioxane polymer of the present disclosure adjacent to the substrate.

In another embodiment, an article is provided that includes: a substrate; and a composition, which includes a silsesquioxane polymer and a free siloxane, of the present disclosure adjacent to the substrate.

As used herein, the terms "silicone" and "siloxane" are used interchangeably to mean a compound, particularly a polymer, that includes a chain of alternating silicon atoms and oxygen atoms, frequently combined with carbon and/or hydrogen.

The term "alkyl" refers to a monovalent group that is a radical of an alkane and includes straight-chain (i.e., linear), branched, cyclic, and bicyclic alkyl groups, and combinations thereof, including both unsubstituted and substituted alkyl groups. Unless otherwise indicated, the alkyl groups typically contain from 1 to 100 carbon atoms. In some embodiments, the alkyl groups contain 1 to 60 carbon atoms, 1 to 30 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, norbornyl, and the like.

The term "alkylene" refers to a divalent group that is a radical of an alkane and includes groups that are linear, branched, cyclic, bicyclic, or a combination thereof. Unless otherwise indicated, the alkylene group typically has 1 to 100 carbon atoms. In some embodiments, the alkylene group has 1 to 60 carbon atoms, 1 to 30 carbon atoms, 1 to 10 carbon atoms, 1 to 6 carbon atoms, or 1 to 4 carbon atoms. Examples of "alkylene" groups include methylene, ethylene, propylene, 1,4-butylene, 1,4-cyclohexylene, and 1,4-cyclohexyldimethylene.

The term "carbonyl" means a divalent group of formula —C(O)— where the carbon atoms is bonded to the oxygen with a double bond.

The term "oxy" means a divalent group of formula —O—.

The term "thio" means a divalent group of formula —S—.

The terms "polymer" and "polymeric material" include, but are not limited to, organic homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries.

Herein, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein, the term "room temperature" refers to a temperature of 20° C. to 25° C. or 22° C. to 25° C.

The term "in the range" or "within a range" (and similar statements) includes the endpoints of the stated range.

Groupings of alternative elements or embodiments disclosed herein are not to be construed as limitations. Each group member may be referred to and claimed individually or in any combination with other members of the group or other elements found therein. It is anticipated that one or more members of a group may be included in, or deleted from, a group for reasons of convenience and/or patentability. When any such inclusion or deletion occurs, the specification is herein deemed to contain the group as modified thus fulfilling the written description of all Markush groups used in the appended claims.

When a group is present more than once in a formula described herein, each group is "independently" selected, whether specifically stated or not. For example, when more than one L group is present in a formula, each L group is independently selected.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION OF ILLUSTRATIVE EMBODIMENTS

The present disclosure provides silsesquioxane (SSQ) polymers, compositions that include such polymers and free siloxanes, and articles with layers including such SSQ polymers or compositions. In certain embodiments, such layers are release layers.

Figure 1:
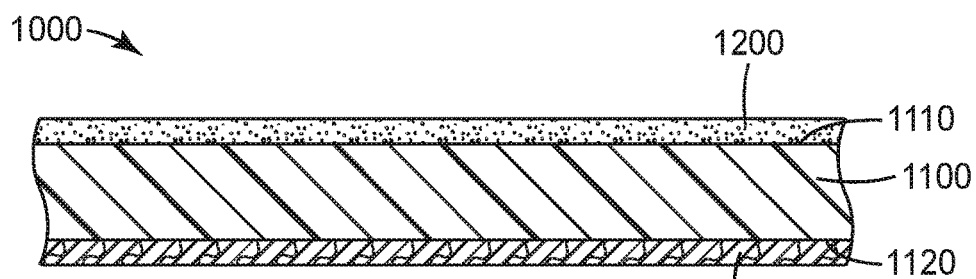
FIG. 1 is a profile view of an article as described herein.

For example, in one embodiment, an article is shown in FIG. 1 that includes a substrate having two major surfaces, a pressure sensitive adhesive adjacent one major surface and a release layer adjacent the other major surface.

Figure 2:
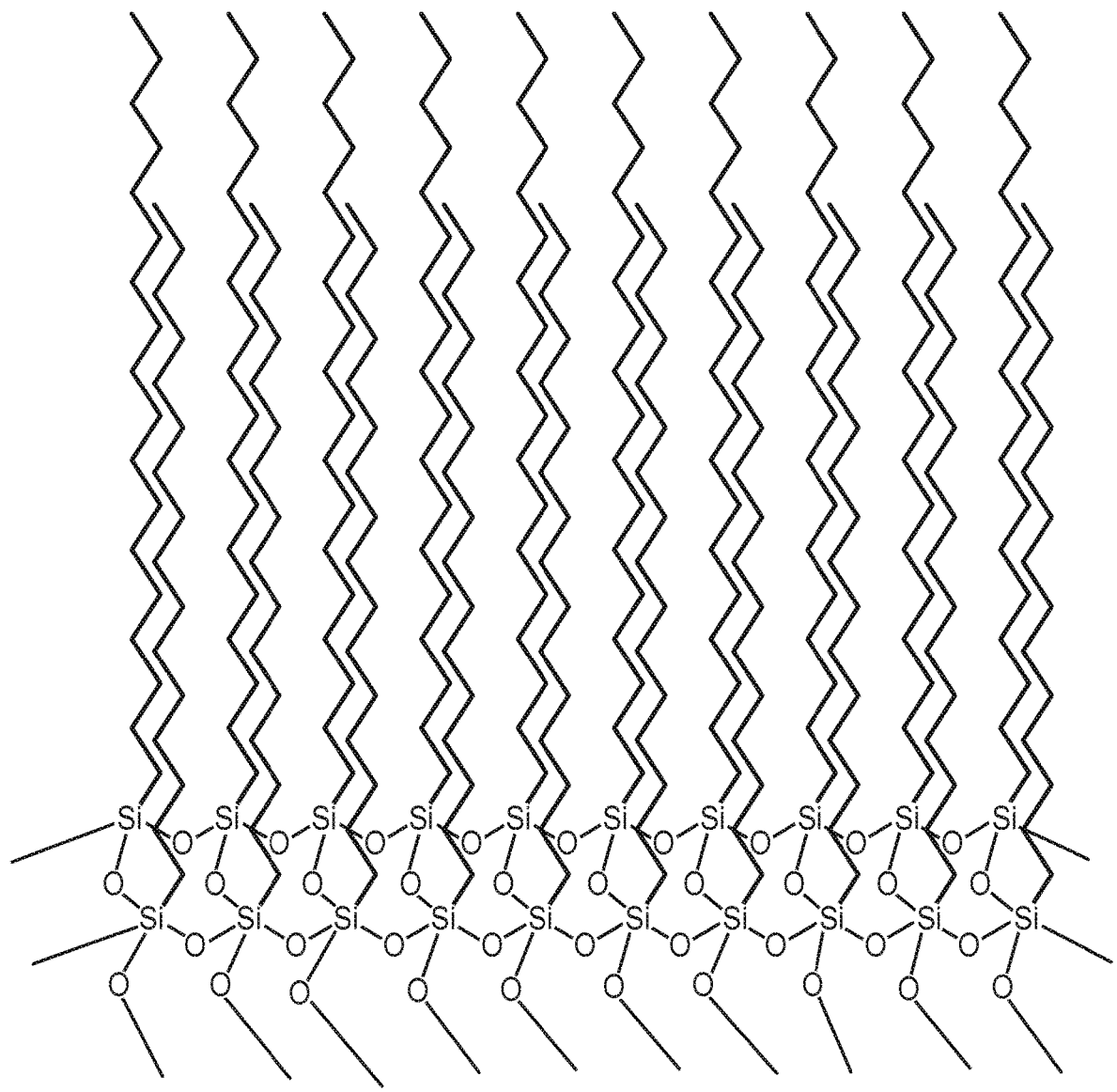
FIG. 2 is a schematic representation of co-crystallized hydrocarbon chains in a representative silsesquioxane polymer.

The silsesquioxane polymers of the present disclosure display excellent water repellent properties when applied to a substrate, whether it has a smooth or textured surface. The unique structure of the silsesquioxane polymers allows the hydrocarbon chains to co-crystallize (as shown in FIG. 2). As a result, they also have superior release properties, particularly when combined with a free siloxane.

In certain embodiments, compositions of the present disclosure include free siloxanes. In this context, "free" means that the siloxane is not covalently bonded to any other component in the composition, such as the SSQ polymers, or to a substrate.

In certain embodiments, compositions are described as including Component (A), which includes one or more silsesquioxane polymers, and Component (B), which includes one or more free siloxanes. In certain embodiments, the compositions of the present disclosure include up to 99.9 wt-% of Component (A), based on the total weight of Components (A) and (B). In certain embodiments, the compositions of the present disclosure include at least 90 wt-% of Component (A), based on the total weight of Components (A) and (B). In certain embodiments, the compositions of the present disclosure include up to 10 wt-%, or up to 5 wt-%, of Component (B), based on the total weight of Components (A) and (B). In certain embodiments, the compositions of the present disclosure include at least 0.1 wt-% of Component (B), based on the total weight of Components (A) and (B).

When applied to a substrate, the compositions of the present disclosure provide low surface energy release coatings. The incorporation of a free siloxane enhances the release (a lower release adhesion strength per the Release Adhesion Strength Test in the Examples Section) without compromising adhesion, as demonstrated by the Readhesion Peel Strength Test and Retention of Initial Peel Adhesion Strength Test data shown in the Examples Section.

Silsesquioxane Polymer

A silsesquioxane polymer of the present disclosure is solid at 25° C. and includes a three-dimensional network of Formula (I):

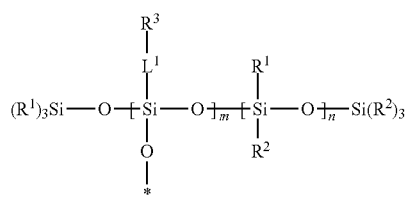

wherein this structure indicates the building blocks of the polymer, and each oxygen atom at an asterisk (*) is bonded to another Si atom within the three-dimensional network of the polymer. In typical polymers, the -$L^1$-$R^3$-containing repeat units and the —Si($R^1$)($R^2$)-containing units are randomly distributed in the polymers.

In Formula (I), each $R^1$ and $R^2$ is independently a (C1-C4)alkyl (e.g., a methyl group). In certain embodiments, each $R^1$ and $R^2$ is a methyl group.

In Formula (I), each $L^1$ is independently a single bond, an alkylene, or an alkylene bonded to a group selected from oxy, thio, carbonyl, —NH—, and combinations thereof (e.g., ester or amide). Typically, in each $L^1$ there is only one of such group or combination thereof (e.g., only one oxy, thio, carbonyl, —NH— ester, or amide), and $L^1$ is selected such that each Si atom is directly bonded to an alkylene or an alkyl.

In certain embodiments of Formula (I), each $L^1$ is a single bond. In certain embodiments, at least a portion of the $L^1$ groups are single bonds, and at least a portion of the $L^1$ groups are an alkylene bonded to a group selected from oxy, thio, carbonyl, —NH—, and combinations thereof.

In Formula (I), each $R^3$ is independently a linear (C14-C100)alkyl. There are at least 14, at least 16, at least 18, at least 20, at least 30, or at least 40 carbon atoms and up to 100, up to 80, up to 60, up to 40, or up to 30 carbon atoms. In certain embodiments, each $R^3$ is independently a linear (C14-C60)alkyl. In certain embodiments, each $R^3$ is independently a linear (C16-C60)alkyl. In certain embodiments, each $R^3$ is independently a linear (C18-C30)alkyl.

In Formula (I), m is an integer of at least 2.
In Formula (I), n is an integer of at least 1.
In Formula (I), m+n is an integer of at least 10. In certain embodiments, m+n is an integer of at least 25, or at least 50. In certain embodiments, m+n is an integer of up to 500, or up to 400, or up to 300, or up to 200, or up to 100.

In certain embodiments of Formula (I), m÷(m+n) is up to 0.80. In certain embodiments of Formula (I), m÷(m+n) at least 0.10, at least 0.20, at least 0.30, or at least 0.50.

In certain embodiments of Formula (I), the silsesquioxane polymer of the present disclosure has a (weight average) molecular weight of at least 25,000 Daltons. In certain embodiments, the silsesquioxane polymer of the present disclosure has a (weight average) molecular weight of up to 250,000 Daltons. For example, the (weight average) molecular weight can be at least 50,000 Daltons, at least 100,000 Daltons and up to 200,000 Daltons or up to 150,000 Daltons.

SSQ polymers of the present disclosure can be made using well-known techniques, as exemplified in the Examples Section. For example, SSQ polymers can be generally prepared by acid- or base-catalyzed hydrolysis and condensation of silanes that include at least three hydrolyzable groups, such as trialkoxysilane, trichlorosilanes, tribromosilanes, triiodosilanes, triacetoxysilanes, etc. Generally, the hydrolysis leads to the formation of reactive silanol groups, which condense together to form silicon-oxygen-silicon bonds. The residual silanol groups can further be capped with a capping agent (silane with one hydrolyzable group), such as trimethylethoxysilane, trimethylchlorosilane, triethylchlorosilane, vinyldimethylethoxysilane, divinylmethylethoxysilane, trivinylethoxysilane, etc.

Free Siloxanes

The free siloxanes used in the compositions of the present disclosure may be a wide variety of non-functional silicones or functional silicones that will not covalently bond with the other components of the composition or with a substrate. In certain embodiments, the free siloxanes useful in the present disclosure are polydiorganosiloxanes, i.e., polymeric materials comprising a polysiloxane backbone.

General references regarding silicone-containing polymers include Kirk-Othmer Encyclopedia of Polymer Science and Engineering, $2^{nd}$ edition, Wiley-Interscience Pub., 1989, volume 15, pp. 235-243; Comprehensive Organometallic Chemistry, Ed. Geoffrey Wilkinson, Vol. 2, Chapter 9.3, F. O. Stark, J. R. Falender, A. P. Wright, pp. 329-330, Pergamon Press: New York, 1982; Silicones and Industry: A Compendium for Practical Use, Instruction, and Reference, A. Tomanek, Carl Hanser: Wacher-Chemie: Munich, 1993; Siloxane Polymers, S. J. Clarson, Prentice Hall: Englewood Cliffs, N J, 1993; and Chemistry and Technology of Silicones, W. Noll, Verlag Chemie: Weinheim, 1960.

In certain embodiments, the free siloxanes of the compositions of the present disclosure can be generally categorized in one of four types of polymers: Class I is equal to dimethyl siloxanes, such as high molecular weight polydimethyl siloxanes (PDMS); Class II is equal to long chain silicone homopolymers or copolymers with PDMS; Class III is equal to high molecular weight PDMS-fluorosilicone copolymers or fluorosilicone homopolymers; and Class IV is equal to long chain PDMS-fluorosilicone copolymers or long chain fluorosilicone copolymers (no PDMS). These four classes can be categorized into two separate structures: Formula (II) below describes polymers of Classes I and III; and Formula (III) below describes polymers of Classes II and IV.

In certain embodiments, a free siloxane is provided that includes a polymer of Formula (II):

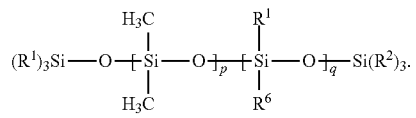

In Formula (II), each $R^1$ and $R^2$ is independently a (C1-C4)alkyl (e.g., a methyl group). In certain embodiments, each $R^1$ and $R^2$ is a methyl group.

In Formula (II), each $R^6$ is independently —$CH_2CH_2(CF_2)_tCF_3$, wherein t is 0 to 10.

In Formula (II), p is an integer of 0 or above.

In Formula (II), q is an integer of 0 or above.

In Formula (II), p+q is at least 1. In certain embodiments of Formula (II), p+q is an integer of at least 10, or at least 100, or at least 500, or at least 6000, or at least 9000. In certain embodiments of Formula (II), p+q is an integer of up to 14,000. In certain embodiment, p+q is within a range of 7,000 to 14,000.

In certain embodiments of Formula (II), q=0, p is an integer of at least 1, and p+q is an integer of at least 10 (which results in a high molecular weight PDMS with no fluorinated groups, a polymer of Class I).

In certain embodiments of Formula (II), q is an integer of at least 1 (resulting in a PDMS-fluorosilicone copolymer or a fluorosilicone homopolymer, which is a polymer of Class III). In certain of these embodiments of Formula (II) (wherein q is an integer of at least 1), p=0, and p+q is an integer of at least 10 (resulting in a fluorosilicone homopolymer, which is a polymer of Class III), or p is an integer of at least 1 (which results in a high molecular weight PDMS-fluorosilicone copolymer, a polymer of Class III).

In certain embodiments of Formula (II), the free siloxane of Formula (II) has a (weight average) molecular weight of at least 50,000 Daltons, or at least 500,000 Daltons, or at least 700,000 Daltons. In certain embodiments of Formula (II), the free siloxane of Formula (II) has a (weight average) molecular weight of up to 1 million Daltons.

In certain embodiments, a free siloxane is provided that includes a polymer of Formula (III):

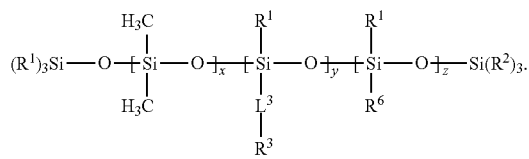

In Formula (III), each $R^1$ and $R^2$ is independently a (C1-C4)alkyl (e.g., a methyl group). In certain embodiments, each $R^1$ and $R^2$ is a methyl group.

In Formula (III), each $L^3$ is independently a single bond, an alkylene, or an alkylene bonded to a group selected from oxy, thio, carbonyl, —NH—, and combinations thereof. In certain embodiments of Formula (III), each $L^3$ is a bond. In certain embodiments of Formula (III), at least a portion of the $L^3$ groups are bonds, and at least a portion of the $L^3$ groups are an alkylene bonded to a group selected from oxy, thio, carbonyl, —NH—, and combinations thereof.

In Formula (III), each $R^3$ is independently a linear (C14-C100)alkyl. In certain embodiments of Formula (III), each $R^3$ is independently a linear (C14-C60)alkyl. In certain embodiments, each $R^3$ is independently a linear (C16-C60) alkyl. In certain embodiments, each $R^3$ is independently a linear (C18-C30)alkyl.

In Formula (III), each $R^6$ is independently —$CH_2CH_2(CF_2)_tCF_3$, wherein t is 0 to 10.

In Formula (III), x is an integer of 0 or above.

In Formula (III), y is an integer of at least 2.

In Formula (III), z is an integer of 0 or above.

In Formula (III), x+y+z is an integer of at least 2. In certain embodiments, x+y+z is an integer of at least 10, or at least 25. In certain embodiments, x+y+z is an integer of up to 300. In certain embodiments, x+y+z is within a range of 15 to 40.

In certain embodiments of Formula (III), z=0 (resulting in a long chain silicone homopolymer or copolymer with PDMS, with no fluorinated groups, which is a polymer of Class II). In certain of these embodiments of Formula (III) (wherein z=0), x=0 (resulting in a long chain silicone homopolymer with no fluorinated groups and no PDMS, which is a polymer of Class II).

In certain embodiments of Formula (III), x is at least 1 (resulting in a long chain silicone copolymer with PDMS but no fluorinated groups, which is a polymer of Class II).

In certain embodiments of Formula (III), z is an integer of at least 1 (resulting in a long chain PDMS-fluorosilicone copolymer or a long chain fluorosilicone copolymer with no PDMS, which is a polymer of Class IV). In certain of these embodiments of Formula (III), x=0 and z is an integer of at least 2 (resulting in a long chain fluorosilicone copolymer with no PDMS, which is a polymer of Class IV). In certain of these embodiments of Formula (III) (wherein z is an integer of at least 1), x is at least 1 (resulting in a long chain PDMS-fluorosilicone copolymer, which is a polymer of Class IV).

In certain embodiments, the free siloxane of Formula (III) has a (weight average) molecular weight of at least 2,000 Daltons, at least 5,000 Daltons, or at least 10,000 Daltons. In certain embodiments, the free siloxane of Formula (III) has a (weight average) molecular weight of up to 100,000 Daltons, up to 75,000 Daltons, up to 50,000 Daltons, or up to 25,000 Daltons.

Siloxanes of the present disclosure can be obtained commercially or made using well-known techniques, as exemplified in the Examples Section. For example, silicone-containing polymers are commercially available from sources such as Dow Corning under the tradenames FBL3289, XIAMETER PMX-1403, XIAMETER PMX-1411, XIAMETER PMX 1501, and Xiameter PMX-1503, and Momentive Performance Materials under the tradenames SILSOFT SE30, SS4191A, CRTV940, and SE74.

Articles

The present disclosure also provides an article that includes a substrate and an SSQ polymer, or a composition as described herein adjacent to the substrate.

An article may include a substrate having a first major surface and a second major surface with an SSQ polymer or a composition as described herein adjacent at least one major surface. Any suitable substrate can be used. Many substrates are moldable thermoplastics.

The substrate may be a hard surface (e.g., floor), a film (e.g., PET film), or a fibrous substrate (e.g., nonwoven web), for example. Useful substrates include ceramics, paper, siliceous substrates, including glass, metal, natural and man-made stone, and polymeric materials, including thermoplastics and thermosets. The substrate may be a fabric (e.g., nonwoven, woven, or knitted fabric) or leather. Suitable materials include, for example, polyester and nylon.

In many cases, the substrate is extrudable. Exemplary extrudable materials include homopolymers, copolymers, and blends of polymers. A variety of additives, such as additives that facilitate extrusion, pigments, dyes, and the like, can be added. Suitable polymers include, but are not limited to, polyolefins such as polypropylene or polyethylene, polyester, polystyrene, polycarbonate, polymethyl methacrylate, ethylene vinyl acetate copolymers, acrylate-modified ethylene vinyl acetate polymers, ethylene acrylic acid copolymers, nylon, polyvinylchloride, polyimide, and engineering polymers such as polyketones or polymethylpentanes. Mixtures of such polymers may also be used.

The articles of the present disclosure may be pressure sensitive adhesive-containing articles. Pressure sensitive adhesive-containing articles, such as tapes, are often packaged such that the pressure sensitive adhesive is in contact with another portion of the article. For example, when the article is a tape, the tape is typically wound (e.g., rolled) such that the pressure sensitive adhesive is in contact with the tape backing. In order to facilitate easy removal of the pressure sensitive adhesive without significant detrimental effect, the substrate can have a release layer disposed on the side opposite that of the adhesive. In tapes, release layers are sometimes known as low adhesion backsides ("LABs").

If the article is a release article (e.g., a release liner), or an adhesive article (typically, a pressure-sensitive article) that includes a release coating (i.e., release layer), the substrate may be a flexible backing. Examples of materials that can be included in the flexible backing include paper, polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose, and the like. Commercially available backing materials useful in the disclosure include HOSTAPHAN 3SAB, primed polyester film (available from Mitsubishi Polyester Film Inc., Greer, S.C.), kraft paper (available from Monadnock Paper, Inc.); cellophane (available from Flexel Corp.); spun-bond poly(ethylene) and poly(propylene), such as TYVEK and TYPAR (available from DuPont, Inc.); and porous films obtained from poly(ethylene) and poly(propylene), such as TESLIN (available from PPG Industries, Inc.), and CELLGUARD (available from Hoechst-Celanese).

Flexible backings may also be prepared of fabric such as woven fabric formed of threads of synthetic or natural materials such as cotton, nylon, rayon, glass, ceramic materials, and the like, or nonwoven fabric such as air laid webs of natural or synthetic fibers or blends of these. The backing may also be formed of metal, metalized polymer films, or ceramic.

The articles may take the form of any article conventionally known to be utilized with pressure sensitive adhesives, such as labels, tapes, signs, covers, marking indicia, and the like.

In one embodiment, an article is shown in FIG. 1, wherein an article 1000 includes substrate 1100, which can be any substrate such as those described herein, having a first major surface 1110 and second major surface 1120. A pressure sensitive adhesive 1200, which can be any pressure sensitive adhesive such as those described herein, is disposed on the first major surface 1110. A release layer 1300 including an SSQ polymer, or a composition of the present disclosure is disposed on second major surface 1120.

One or more pressure sensitive adhesives may be disposed on the first major surface of the substrate. Any suitable pressure sensitive adhesive can be used. Pressure sensitive adhesives are normally tacky at room temperature and can be adhered to a surface by application of light finger pressure. Thus, pressure sensitive adhesives can be distinguished from other types of adhesives that are not pressure sensitive. A general description of pressure sensitive adhesives can be found in the Encyclopedia of Polymer Science and Engineering, Vol. 13, Wiley-Interscience Publishers (New York, 1988). Additional description of pressure sensitive adhesives can be found in the Encyclopedia of Polymer Science and Technology, Vol. 1, Interscience Publishers (New York, 1964). Typically, pressure sensitive adhesives include one or more elastomeric polymers, optionally in combination with one or more tackifying resins, and other additives such as plasticizers, fillers, antioxidants, stabilizers, pigments, and the like. Such additives are well known the person of ordinary skill in the art.

Elastomeric polymers that are useful in the one or more pressure sensitive adhesives include one or more (meth) acrylic polymers, natural or synthetic rubbers, block copolymers (typically of styrene and dienes), silicones, and the like. Suitable materials include, without limitation, polyvinyl ethers, polyisoprenes, butyl rubbers, polyisobutylenes, polychloroprenes, butadiene-acrylonitrile polymers, styrene-isoprene, styrene-butylene, styrene-diene-based block copolymers (such as styrene-isoprene-styrene, styrene-butadiene-styrene, styrene-isoprene-butadiene-styrene, styrene-ethylene-butadiene-styrene, and styrene-ethylene-propylene-styrene), ethylene-propylene-diene polymers, poly-alpha-olefins, amorphous polyolefins, polysiloxanes, ethylene vinyl acetates, polyurethanes, silicone-urea polymers, silicone-urethane polymers, polyvinylpyrrolidones, and any combination thereof. Examples of suitable (meth) acrylic (i.e., acrylic or methacrylic) polymers include polymers made from the polymerization of one or more (meth) acrylates (i.e., acrylates or methacrylates). Commonly used (meth)acrylates include methyl methacrylate, ethyl methacrylate, n-butyl methacrylate, methyl acrylate, ethyl acrylate, n-butyl acrylate, iso-octyl acrylate, iso-nonyl acrylate, 2-ethyl-hexyl acrylate, decyl acrylate, dodecyl acrylate, n-butyl acrylate, hexyl acrylate, octadecyl acrylate, octadecyl methacrylate, acrylic acid, methacrylic acid, acrylonitrile, isobornyl (meth)acylate, and combinations thereof. Examples of suitable commercially available block copolymers include those available under the trade designation KRATON from Kraton Polymers, Houston, Tex. Any of these or other suitable materials may be used in any combination, depending on the performance requirements of the final material.

One or more tackifiers can be used as components of a pressure sensitive adhesive. Suitable tackifiers include wood rosins, hydrogenated rosins, tall oil rosins, terpene resins, phenolic resins, polyaromatics, petroleum-based resins, such as aliphatic C5 olefin-derived resins, and the like. Those of ordinary skill in the art recognize that a variety of tackifiers are available, and the specific choice of whether to use one or more tackifiers, and which one or more tackifiers to use, will depend on the performance requirements of the final product. Tackifiers are not required and are not used in all cases. For example, some pressure sensitive adhesives, such as those which include elastomers that are self-tacky, are often used without added tackifier.

A coating composition for application of a silsesquioxane polymer and a free siloxane to a substrate surface can include an organic solvent, if desired. Typically, both Components A (one or more silsesquioxane polymers) and B (one or more silicone-containing polymers) are dissolved in solvent. They may form miscible or immiscible blends, as long as the free silicone can bloom to the surface of the coating to enhance the release characteristics of the coating.

Useful solvents for the coating compositions include those in which the compound is soluble at the level desired. Typically, such organic solvent includes toluene, heptane, methyl ethyl ketone, ethyl acetate, xylene, or mixtures thereof. Any amount of the optional organic solvent can be used. For example, a coating composition can include up to 50 wt-% or even more of organic solvent (e.g., up to 99 wt-%). The solvent can be added to provide the desired viscosity to the coating composition. In some embodiments, no solvent or only low levels (e.g., up to 10 wt-%) of organic solvent is used in the coating composition.

A wide variety of optional additives can be included in coating compositions of the present disclosure. Examples include surfactants, defoamers, air release additives, thixotropic agents, inorganic particles, organic particles, pigments, wetting agents, dispersing agents, surface additives, adhesion promoters, emulsifying agents, process aids, etc. Various combinations of such additives can be used if desired. The amount of such additive will depend on the application, and can be readily determined by one of skill in the art.

The coating composition typically has a viscosity appropriate to the application conditions and method. For example, a material to be brush or roller coated would likely be preferred to have a higher viscosity than a dip coating composition.

A wide variety of coating methods can be used to apply a composition of the present disclosure, such as brushing, spraying, dipping, rolling, spreading, and the like. Other coating methods can also be used, particularly if no solvent is included in the coating composition. Such methods include knife coating, gravure coating, die coating, and extrusion coating, for example.

A coating composition of the present disclosure can be applied in a continuous or patterned layer. Such layer can be disposed on at least a portion of at least one surface of the substrate. If the composition includes an organic solvent, the coated composition can be exposed to conditions that allow the organic solvent to evaporate from the composition.

EXEMPLARY EMBODIMENTS

Embodiment 1 is a silsesquioxane polymer comprising a three-dimensional branched network of Formula (I):

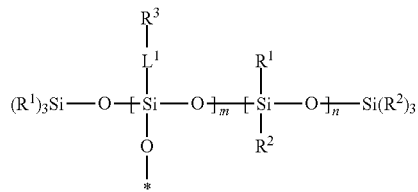

wherein
each $R^1$ and $R^2$ is independently a (C1-C4)alkyl;
each $L^1$ is independently a single bond, an alkylene, or an alkylene bonded to a group selected from oxy, thio, carbonyl, —NH—, and combinations thereof;
each $R^3$ is independently a linear (C14-C100)alkyl;
with the proviso that $L^1$ is selected such that each Si atom is directly bonded to an alkylene or an alkyl;
m is an integer of at least 2;
n is an integer of at least 1;
m+n is an integer of at least 10;
each oxygen atom at an asterisk (*) is bonded to another Si atom within the three-dimensional network; and
the silsesquioxane polymer is a solid at 25° C.
Embodiment 2 is the silsesquioxane polymer of embodiment 1 wherein, in Formula (I), m÷(m+n) is up to 0.80.

Embodiment 3 is the silsesquioxane polymer of embodiment 1 or 2 wherein, in Formula (I), m÷(m+n) is at least 0.10 (or at least 0.5).

Embodiment 4 is the silsesquioxane polymer of any one of embodiments 1 through 3 wherein each $R^3$ of Formula (I) is independently a linear (C14-C60)alkyl.

Embodiment 5 is the silsesquioxane polymer of embodiment 4 wherein each $R^3$ of Formula (I) is independently a linear (C16-C60)alkyl.

Embodiment 6 is the silsesquioxane polymer of embodiment 5 wherein each $R^3$ of Formula (I) is independently a linear (C18-C30)alkyl.

Embodiment 7 is the silsesquioxane polymer of any one of embodiments 1 through 6 wherein each $L^1$ of Formula (I) is a single bond.

Embodiment 8 is the silsesquioxane polymer of any one of embodiments 1 through 6 wherein at least a portion of the $L^1$ groups of Formula (I) are bonds, and at least a portion of the $L^1$ groups of Formula (I) are an alkylene bonded to a group selected from oxy, thio, carbonyl, —NH—, and combinations thereof.

Embodiment 9 is the silsesquioxane polymer of any one of embodiments 1 through 8 wherein each $R^1$ and $R^2$ of Formula (I) is a methyl group.

Embodiment 10 is the silsesquioxane polymer of any one of embodiments 1 through 9 wherein, in Formula (I), m+n is an integer of at least 25 (or at least 50).

Embodiment 11 is the silsesquioxane polymer of any one of embodiments 1 through 10 wherein, in Formula (I), m+n is an integer of up to 500 (or up to 400, or up to 300, or up to 200, or up to 100).

Embodiment 12 is the silsesquioxane polymer of any one of embodiments 1 through 11 which has a (weight average) molecular weight of at least 25,000 Daltons.

Embodiment 13 is the silsesquioxane polymer of any one of embodiments 1 through 12 which has a (weight average) molecular weight of up to 250,000 Daltons.

Embodiment 14 is a composition comprising: Component (A) comprising a silsesquioxane polymer comprising a three-dimensional network of Formula (I) of any one of embodiments 1 through 13; and Component (B) comprising a free siloxane.

Embodiment 15 is the composition of embodiment 14 comprising at least 90 wt-% (or at least 95 wt-%) of Component (A), or up to 99.9 wt-% of Component (A), based on the total weight of Components (A) and (B).

Embodiment 16 is the composition of embodiment 14 or 15 comprising at least 0.1 wt-% of Component (B), and, in certain embodiments, up to 10 wt-% (or up to 5 wt-%) of Component (B), based on the total weight of Components (A) and (B).

Embodiment 17 is the composition of any one of embodiments 14 through 16 wherein Component (B) comprises a free siloxane of Formula (II):

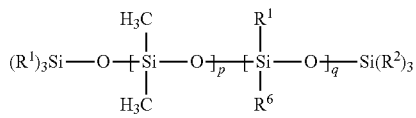

wherein:
each $R^1$ and $R^2$ is independently a (C1-C4)alkyl;
each $R^6$ is independently —$CH_2CH_2(CF_2)_tCF_3$, wherein t is 0 to 10;
p is an integer of 0 or above;

q is an integer of 0 or above, and
p+q is at least 1.

Embodiment 18 is the composition of embodiment 17 wherein, in Formula (II), q=0, p is an integer of at least 1, and p+q is an integer of at least 10.

Embodiment 19 is the composition of embodiment 17 wherein, in Formula (II), q is an integer of at least 1.

Embodiment 20 is the composition of embodiment 19 wherein, in Formula (II), p=0 and p+q is an integer of at least 10.

Embodiment 21 is the composition of embodiment 19 wherein, in Formula (II), p is an integer of at least 1.

Embodiment 22 is the composition of any one of embodiments 17 through 21 wherein, in Formula (II), p+q is an integer of at least 100 (at least 500, at least 6000, or at least 9000).

Embodiment 23 is the composition of any one of embodiments 17 through 22 wherein, in Formula (II), p+q is an integer of up to 14,000.

Embodiment 24 is the composition of any one of embodiments 17 through 23 wherein each $R^1$ and $R^2$ of Formula (II) is a methyl group.

Embodiment 25 is the composition of any one of embodiments 17 through 24 wherein the free siloxane of Formula (II) has a weight average molecular weight of at least 50,000 Daltons (or at least 500,000 Daltons, or at least 700,000 Daltons).

Embodiment 26 is the composition of any one of embodiments 17 through 25 wherein the free siloxane of Formula (II) has a weight average molecular weight of up to 1 million Daltons.

Embodiment 27 is the composition of any one of embodiments 14 through 16 wherein Component (B) comprises a free siloxane of Formula (III):

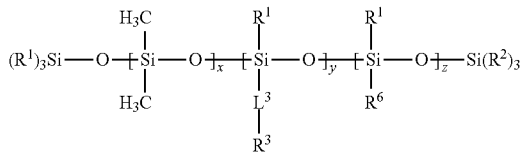

wherein:
each $R^1$ and $R^2$ is independently a (C1-C4)alkyl;
each $L^3$ is independently a single bond, an alkylene, or an alkylene bonded to a group selected from oxy, thio, carbonyl, —NH—, and combinations thereof;
each $R^3$ is independently a linear (C14-C100)alkyl;
each $R^6$ is independently —$CH_2CH_2(CF_2)_tCF_3$, wherein t is 0 to 10;
x is an integer of 0 or above;
y is an integer of at least 2;
z is an integer of 0 or above; and
x+y+z is an integer of at least 2.

Embodiment 28 is the composition of embodiment 27 wherein, in Formula (III), z=0.

Embodiment 29 is the composition of embodiment 28 wherein, in Formula (III), x=0.

Embodiment 30 is the composition of embodiment 28 wherein in, Formula (III), x is at least 1.

Embodiment 31 is the composition of embodiment 27 wherein, in Formula (III), z is an integer of at least 1.

Embodiment 32 is the composition of embodiment 31 wherein, in Formula (III), x=0 and z is an integer or at least 2.

Embodiment 33 is the composition of embodiment 31 wherein, in Formula (III), x is at least 1.

Embodiment 34 is the composition of any one of embodiments 27 through 33 wherein each $R^1$ and $R^2$ of Formula (III) is a methyl group.

Embodiment 35 is the composition of any one of embodiments 27 through 34 wherein each $R^3$ of Formula (III) is independently a linear (C14-C60)alkyl.

Embodiment 36 is the composition of embodiment 35 wherein each $R^3$ of Formula (III) is independently a linear (C16-C60)alkyl.

Embodiment 37 is the composition of embodiment 36 wherein each $R^3$ of Formula (III) is independently a linear (C18-C30)alkyl.

Embodiment 38 is the composition of any one of embodiments 27 through 37 wherein each $L^3$ of Formula (III) is a bond.

Embodiment 39 is the composition of any one of embodiments 27 through 38 wherein at least a portion of the $L^3$ groups of Formula (III) are bonds, and at least a portion of the $L^3$ groups of Formula (III) are an alkylene bonded to a group selected from oxy, thio, carbonyl, —NH—, and combinations thereof.

Embodiment 40 is the composition of any one of embodiments 27 through 39 wherein, in Formula (III), x+y+z is an integer of at least 10 (or at least 25).

Embodiment 41 is the composition of any one of embodiments 27 through 40 wherein, in Formula (III), x+y+z is an integer of up to 300.

Embodiment 42 is the composition of any one of embodiments 27 through 41 wherein the free siloxane of Formula (III) has a (weight average) molecular weight of at least 2,000 Daltons (or at least 10,000 Daltons).

Embodiment 43 is the composition of any one of embodiments 27 through 42 wherein the free siloxane of Formula (III) has a (weight average) molecular weight of up to 100,000 Daltons (or up to 25,000 Daltons).

Embodiment 44 is an article comprising: a substrate; and a layer comprising a silsesquioxane polymer of any one of embodiments 1 through 13, or a composition of any one of embodiments 14 through 43, adjacent to the substrate.

Embodiment 45 is the article of embodiment 44 which is a pressure sensitive adhesive-containing article, wherein the substrate has a first major surface and a second major surface, wherein the first major surface has a layer comprising a pressure sensitive adhesive adjacent thereto and the second major surface has the layer comprising a silsesquioxane polymer of any one of embodiments 1 through 13, or a composition of any one of embodiments 14 through 43 adjacent thereto.

Embodiment 46 is the article of embodiment 44 or 45 wherein the article is a release liner.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Unless otherwise noted, all parts, percentages, ratios, etc. in the examples are by weight. Unless otherwise specified, all reagents used in the examples were obtained, or are available, from general chemical suppliers such as, for example, Sigma-Idrich Company, Saint Louis, Mo., or may be synthesized by conventional methods.

Materials inches) were then applied to the cleaned test panels with the adhesive side in contact with the test panel. The tape samples were then rolled over using a 2.0-kilogram (4.5-pound) rubber roller one time in each direction. The taped panels were stored and tested at 23° C. and 50% relative humidity (RH). Testing was conducted between 1 and 8 hours after preparation. Three to five taped panels were evaluated and the average peel adhesion strength of the total number of panel tested was reported. Results were obtained in grams/

| Designation | Description |
| --- | --- |
| n-Octadecyltrimethoxysilane | n-Octadecyltrimethoxysilane, 95%, having a melting point of 13-17° C., a boiling point of 170° C. at 0.1 millimeter Hg, and a molecular weight of 375 grams/mole, available under the product code SIO6645.0 from Gelest, Incorporated, Morrisville, PA. |
| Dimethyldimethoxy silane | Dimethyldimethoxy silane, 99%, having a boiling point of 82° C. and a molecular weight of 120 grams/mole, available under the product code SID4123.1 from Gelest, Incorporated, Morrisville, PA. |
| 7561 | A fluorosilicone crosslinker containing methylhydrogen and methyltrifluororpropyl siloxanes, available under the trade designation SL-7561 CROSSLINKER from Dow Corning Corporation, Auburn, MI. |
| 7678 | A silicone hydride containing crosslinker containing dimethyl, methylhydrogen siloxane, trimethylsiloxy terminated siloxanes, available under the trade designation SYL-OFF 7678 CROSSLINKER from Dow Corning Corporation, Auburn, MI. |
| Fluorosilicone gum | A solid fluorosilicone gum containing 89-99% trifluoropropylmethyl siloxane and 1-2% of vinylmethyl siloxane, available under the product code VGF-991 from Gelest, Incorporated, Morrisville, PA. |
| Additive 1 | A high molecular weight linear dimethicone gum (polydimethylsiloxane) having a viscosity of 300,000 Poise, available under the trade designation SILSOFT SE30 from Momentive Performance Materials, Waterford, NY. |
| Trimethylethoxysilane | Trimethylethoxysilane, greater than (>) 95%, having a freezing point of −83° C., a boiling point of 75° C., and a molecular weight of 118 grams/mole, available under the product code SIT8515.0 from Gelest, Incorporated, Morrisville, PA. |
| Triethoxysilane | Triethoxysilane, 95-100%, having a melting point of-170° C., a boiling point of 131° C., and a molecular weight of 164 grams/mole, available under the product code SIT8185.0 from Gelest, Incorporated, Morrisville, PA. |
| Karstedt's Catalyst | A platinum-divinyltetramethyldisiloxane complex in xylene, containing between 2.1 and 2.4 weight percent (wt-%) platinum concentration (concentration of pure platinum metal), available under the product code SIP6831.2 from Gelest, Morrisville, PA. |
| 1-Octadecene | A mixture of alpha olefins containing about 90-100 wt-% of olefins having a carbon number of C18 and having an average molecular weight of 252 grams/mole, available under the trade designation ALPHAPLUS 1-OCTADECENE from Chevron Phillips Chemical Company LP, The Woodlands, TX. |
| ALPHAPLUS C26-28 | A mixture of alpha olefins containing about 58 wt-% of olefins having a carbon number of C26 and about 40 weight % of olefins having a carbon number of C28, and having an average molecular weight of 378 grams/mole, available under the trade designation ALPHAPLUS C26-28 from Chevron Phillips Chemical Company LP, The Woodlands, TX. |
| Triethylsilane | Triethylsilane, 95-100%, having a boiling point of 107° C., and a molecular weight of 116 grams/mole, available under the product code SIT8330.0 from Gelest, Incorporated, Morrisville, PA. |

Test Methods

Initial Peel Adhesion Strength

Peel adhesion strength was measured at an angle of 180° using an IMASS SP-200 slip/peel tester (available from IMASS, Incorporated, Accord, Mass.) at a peel rate of 305 millimeters/minute (12 inches/minute). Stainless steel test panels measuring 25.4 centimeters by 12.7 centimeters (10 inches by 5 inches) were cleaned by wiping them with isopropanol using a lint-free tissue and allowing them to air dry for 30 minutes after which they were clamped to the test stage of the peel tester. Tape samples measuring approximately 1.3 centimeters by 20 centimeters (0.5 inch by 8 inch and converted to Newtons/decimeter (N/dm). In addition, it was noted if any adhesive residue remained on the stainless-steel panel after removal of the tape sample.

Release Adhesion Strength

The 180° angle release adhesion strength of a release liner to an adhesive sample was measured in the following manner. SCOTCH BOOK TAPE 845 or POLYESTER TAPE 8403 (3M Company, St. Paul, Minn.) was applied to release liner constructions with the adhesive of the tape in contact with the silicone coated surface of the release liner. The resulting laminates were then rolled over using a 2.0-kilogram (4.5-pound) rubber roller one time in each direction and aged for 7 days at 23° C. and 50% RH prior to testing for release adhesion strength. Next, a double-sided foam tape (3M Double Coated Urethane Foam Tape 4008, a 0.125 inch thick open-cell, flexible urethane foam tape, available from 3M Company, St. Paul, Minn.) was applied to the platen of a peel tester (Slip/Peel Tester, Model 3M90, available from Instrumentors, Incorporated, Strongsville, Ohio). A sample of the release liner/tape laminate, measuring 2.54 centimeters by approximately 20 centimeters (1 inch by 8 inches), was then applied to the exposed foam tape surface such that the exposed surface of the Book Tape contacted the foam tape. This was rubbed down using light thumb pressure followed by rolling over it with a 2.0-kilogram (4.5-pound) rubber roller one time in each direction. The release liner was then removed from the tape at an angle of 180° at a rate of 229 centimeters/minute (90 inches/minute). Results were obtained in grams/inch and converted to Newtons/decimeter (N/dm). Three to five laminates were evaluated and the average release adhesion strength of the total number of laminates tested was reported. All testing was done at 23° C. and 50% RH. Release adhesion results with SCOTCH BOOK TAPE 845 and POLYESTER TAPE 8403 are summarized in Table 3 and Table 4, respectively.

Re-Adhesion Peel Strength and % Retention of Peel Strength

The effect of extractable materials in the release coating of the release liners on the peel adhesion strength of adhesive tapes which contacted the liners was evaluated as follows. After evaluating release liners for their release adhesion strength, the tape was removed from the foam tape and evaluated for its re-adhesion peel strength as described the "Initial Peel Adhesion Strength" test method above. The adhesive layer of the tape was applied to the stainless-steel test panel.

In addition, a tape sample not previously exposed to the release liners described herein was also evaluated for its peel adhesion strength. These results were recorded as "Initial Peel Adhesion Strength". This test was a measure of the effect of any extractables transferred from the release liner to the adhesive layer of the tape on the peel adhesion strength of the tape. It is desirable that there be minimal differences between the initial and re-adhesion peel strength values. Readhesion peel strengths were used to calculate a % Retention value as follows:

% Retention=(Readhesion Peel Strength/Initial Peel Adhesion Strength)×100.

Preparation of C26-28 Adduct of Triethoxysilane

ALPHAPLUS C26-28, 126 grams, was added at room temperature to a 500-milliliter round bottom flask equipped with a condenser and heated at 90° C. for one hour. Next, a mixture of 60 grams triethoxysilane and 0.121 grams of Karstedt's Catalyst was added to the flask at 90° C. followed by stirring for twelve hours. The reaction mixture was then vacuum stripped at 90° C. for one hour to give 165 grams (93% yield) of an off-white solid product which was the C26-28 adduct of triethoxysilane.

Preparation of Octadecyl Silsesquioxane-Co-Dimethylsiloxane Polymer (SSQ Polymer 1)

The following were mixed together at room temperature in a 500-milliliter round bottom flask equipped with a condenser. To a mixture of 200 grams isopropyl alcohol and 100 grams of deionized water containing 1 part HCl per 100 parts water were added 75 grams of octadecyltrimethoxysilane and 25 grams of dimethyldimethoxysilane. The resulting mixture was heated at 70° C. and magnetically stirred for two hours followed by the addition of 20 grams of trimethylethoxysilane. Next, the reaction mixture was stirred at 70° C. for three hours to give a white precipitate. The white precipitate was collected by filtering the mixture through a 240 millimeter diameter, GRADE 1 (11 micrometer), WHATMAN QUALITATIVE FILTER PAPER then washing the precipitate with 500 milliliters of distilled water followed by drying using a vacuum pump at 70° C. for two hours to give 97.0 grams (97% yield) of a white solid, octadecyl silsesquioxane-co-dimethylsiloxane, designated herein as SSQ Polymer 1 (Formula (I), $L^1$=single bond; $R^1$=$R^2$=methyl; $R^3$=C18 alkyl; m=30; n=10).

Preparation of Octadecyl Silsesquioxane-Co-Dimethylsiloxane Polymer (SSQ Polymer 2)

SSQ Polymer 2 was prepared in the same manner as SSQ Polymer 1 with the following modification. 50 grams of octadecyltrimethoxysilane and 50 grams of dimethyldimethoxysilane were used to provide 85.0 grams (85% yield) of a white solid, octadecyl silsesquioxane-co-dimethylsiloxane, designated herein as SSQ Polymer 2 (Formula (I), $L^1$=single bond; $R^1$=$R^2$=methyl; $R^3$=C18 alkyl; m=28; n=25).

Preparation of C26-28 Silsesquioxane-Co-Dimethylsiloxane Polymer (SSQ Polymer 3)

SSQ Polymer 3 was prepared in the same manner as SSQ Polymer 2 with the following modification. 50 grams of C26-28 Adduct of Triethoxysilane was used in place of octadecyltrimethoxysilane to provide 90.0 grams (90% yield) of a white solid, C26-28 Silsesquioxane-co-Dimethylsiloxane polymer (SSQ Polymer 3) designated herein as SSQ Polymer 3 (Formula (I), $L^1$=single bond; $R^1$=$R^2$=methyl; $R^3$=(C26-28)alkyl (mixture); m and n not determined).

Poly(Octadecylmethyl-Co-Dimethyl)Siloxane (Additive 2)

1-Octadecene, 63 grams, was added at room temperature to a 500-milliliter round bottom flask equipped with a condenser. Next, 0.02 gram of Karstedt catalyst solution was added to the flask followed by the addition of 24.5 grams of 7678. The mixture was magnetically stirred at 90° C. for 12 hours. The reaction mixture was poured into 200 milliliters of methanol to precipitate the product which was filtered off to give 81 grams (>92% yield) of an off-white solid, poly(octadecylmethyl-co-dimethyl)siloxane, designated herein as Additive 2 (Formula (III), $R^3$=C18 alkyl; $R^1$=$R^2$=methyl; $L^3$=single bond; x=15; y=20; z=0).

Poly(Octadecylmethyl-Co-Perfluoropropylmethyl)Siloxane (Additive 3)

Poly(octadecylmethyl-co-perfluoropropylmethyl)siloxane was prepared in the same manner as described for Additive 2 with the following modifications. 30 grams of octadecene was employed and 22.7 grams of 7561 was used in place of 7678, along with a reaction temperature of 100° C. Poly(octadecylmethyl-co-perfluoropropylmethyl)siloxane, 45 grams (>94% yield), designated herein as Additive 3 (Formula (III), $R^3$=C18 alkyl; $R^6$=—$(CH_2)_2CF_3$; $R^1$=$R^2$=methyl; $L^3$=single bond; x=0; y=20; z=15), was obtained as an off-white solid.

Poly(Trifluoropropylmethyl-Co-Dimethyl-Co-Ethylmethyl) Siloxane (Additive 4)

Fluorosilicone gum, 25 grams, was dissolved in 100 grams toluene in a 500 milliliter round bottom flask. Next, 0.02 gram of Karstedt catalyst solution was added to the flask followed by the addition of 5.0 grams triethylsilane.

The mixture was magnetically stirred at 90° C. for 24 hours. After evaporating the solvent under vacuum at 100° C. for two hours, 25 grams (>99% yield) of poly(trifluoropropyl-methyl-co-dimethyl-co-ethylmethyl)siloxane was recovered as colorless gum, designated herein as Additive 4 (Formula (II) $R^6$=—$(CH_2)_2CF_3$; $R^1$=$R^2$=methyl; p and q not determined).

Release Coating Compositions

Release coating compositions were prepared by mixing the components and amounts as shown in Tables 1 and 2. The amounts shown are in grams. The resulting solutions were then coated onto a 0.002 inch (51 micrometers) thick polyester film using a Number 6 Mayer Rod and dried in a forced air oven for two minutes at 110° C. (230° F.). Release coated polyester film liner constructions were thereby obtained. These constructions were evaluated for release adhesion strength, re-adhesion peel strength, and % retention of peel strength. The results are summarized in Tables 3 and 4.

TABLE 1

| | Compositions | | | |
|---|---|---|---|---|
| Example | SSQ Polymer 1 | SSQ Polymer 2 | SSQ Polymer 3 | Xylene |
| 1 | 5.0 | 0.0 | 0.0 | 95 |
| 2 | 0.0 | 5.0 | 0.0 | 95 |
| 3 | 0.0 | 0.0 | 5.0 | 95 |

TABLE 2

| | Compositions | | | | | |
|---|---|---|---|---|---|---|
| Example | SSQ Polymer 1 | Additive 1 | Additive 2 | Additive 3 | Additive 4 | Xylene |
| 4 | 5.0 | 0.025 | 0.0 | 0.0 | 0.0 | 95 |
| 5 | 5.0 | 0.05 | 0.0 | 0.0 | 0.0 | 95 |
| 6 | 5.0 | 0.0 | 0.05 | 0.0 | 0.0 | 95 |
| 7 | 5.0 | 0.0 | 0.0 | 0.05 | 0.0 | 95 |
| 8 | 5.0 | 0.0 | 0.0 | 0.0 | 0.05 | 95 |

TABLE 3

| | Results with SCOTCH BOOK TAPE 845 | | | |
|---|---|---|---|---|
| Example | Release Adhesion Strength grams/inch (Newtons/dm) | Initial Peel Adhesion Strength grams/inch (Newtons/dm) | Readhesion Peel Strength grams/inch (Newtons/dm) | Retention of Peel Strength (%) |
| 1 | 168 (185) | 1035 (1138) | 973 (1070) | 94 |
| 2 | 145 (160) | 1035 (1138) | 973 (1070) | 94 |
| 3 | 159 (175) | 1035 (1138) | 890 (979) | 86 |
| 4 | 160 (176) | 1035 (1138) | 952 (1047) | 92 |
| 5 | 145 (160) | 1035 (1138) | 952 (1047) | 92 |
| 6 | 157 (173) | 1035 (1138) | 952 (1047) | 92 |

TABLE 4

| | Results with POLYESTER TAPE 8403 | | | |
|---|---|---|---|---|
| Example | Release Adhesion Strength grams/inch (Newtons/dm) | Initial Peel Adhesion Strength grams/inch (Newtons/dm) | Readhesion Peel Strength grams/inch (Newtons/dm) | Retention of Peel Strength (%) |
| 1 | 290 (319) | 655 (721) | 622 (684) | 95 |
| 7 | 269 (296) | 655 (721) | 590 (649) | 90 |
| 8 | 240 (264) | 655 (721) | 590 (649) | 90 |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A silsesquioxane polymer comprising a three-dimensional branched network of Formula (I):

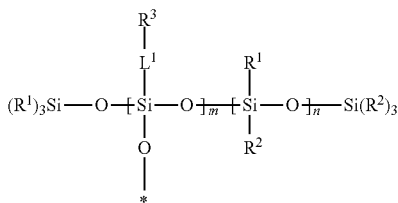

wherein
each $R^1$ and $R^2$ is independently a (C1-C4)alkyl;
each $L^1$ is independently a single bond, an alkylene, or an alkylene bonded to a group selected from oxy, thio, carbonyl, —NH—, and combinations thereof;
each $R^3$ is independently a linear (C14-C100)alkyl;
with the proviso that $L^1$ is selected such that each Si atom is directly bonded to an alkylene or an alkyl;
m is an integer of at least 2;
n is an integer of at least 1;
m+n is an integer of at least 10;
each oxygen atom at an asterisk (*) is bonded to another Si atom within the three-dimensional network; and
the silsesquioxane polymer is a solid at 25° C.

2. The silsesquioxane polymer of claim 1 wherein, in Formula (I), m÷(m+n) is up to 0.80.

3. The silsesquioxane polymer of claim 1 wherein, in Formula (I), m÷(m+n) is at least 0.10.

4. The silsesquioxane polymer of claim 1 wherein each $R^3$ of Formula (I) is independently a linear (C14-C60)alkyl.

5. The silsesquioxane polymer of claim 4 wherein each $R^3$ of Formula (I) is independently a linear (C16-C60)alkyl.

6. The silsesquioxane polymer of claim 5 wherein each $R^3$ of Formula (I) is independently a linear (C18-C30)alkyl.

7. The silsesquioxane polymer of claim 1 wherein each $L^1$ of Formula (I) is a bond.

8. The silsesquioxane polymer of claim 1 wherein at least a portion of the $L^1$ groups of Formula (I) are bonds, and at least a portion of the $L^1$ groups of Formula (I) are an alkylene bonded to a group selected from oxy, thio, carbonyl, —NH—, and combinations thereof.

9. The silsesquioxane polymer of claim 1 wherein, in Formula (I), m+n is an integer of at least 25.

10. The silsesquioxane polymer of claim 1 wherein, in Formula (I), m+n is an integer of up to 500.

11. The silsesquioxane polymer of claim 1 which has a (weight average) molecular weight of at least 25,000 Daltons.

12. The silsesquioxane polymer of claim 1 which has a (weight average) molecular weight of up to 250,000 Daltons.

13. An article comprising:
a substrate; and
a layer comprising a silsesquioxane polymer of claim 1 adjacent to the substrate.

14. A composition comprising:
Component (A) comprising a silsesquioxane polymer comprising a three-dimensional network of Formula (I) of claim 1; and
Component (B) comprising a free siloxane.

15. The composition of claim 14 comprising 90 wt-% to 99.9 wt-% of Component (A), based on the total weight of Components (A) and (B).

16. The composition of claim 14 comprising 0.1 wt-% to 10 wt-% of Component (B), based on the total weight of Components (A) and (B).

17. The composition of claim 14 wherein Component (B) comprises a free siloxane of Formula (II):

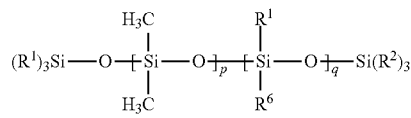

wherein:
each $R^1$ and $R^2$ is independently a (C1-C4)alkyl;
each $R^6$ is independently $CH_2CH_2(CF_2)_tCF_3$, wherein t is 0 to 10;
p is an integer of 0 or above;
q is an integer of 0 or above, and
p+q is at least 1.

18. The composition of claim 14 wherein Component (B) comprises a free siloxane of Formula (III):

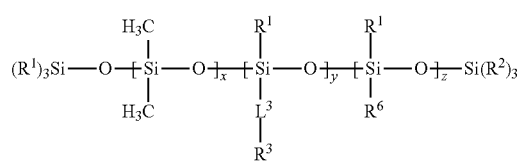

wherein:
each $R^1$ and $R^2$ is independently a (C1-C4)alkyl;
each $L^3$ is independently a single bond, an alkylene, or an alkylene bonded to a group selected from oxy, thio, carbonyl, —NH—, and combinations thereof;
each $R^3$ is independently a linear (C14-C100)alkyl;
each $R^6$ is independently —$CH_2CH_2(CF_2)_tCF_3$, wherein t is 0 to 10;
x is an integer of 0 or above;
y is an integer of at least 2;
z is an integer of 0 or above; and
x+y+z is an integer of at least 2.

19. An article comprising:
a substrate; and
a layer comprising a composition of claim 14 adjacent to the substrate.

20. The article of claim 19 further comprising a layer comprising a pressure sensitive adhesive, wherein the substrate is positioned between the pressure sensitive adhesive layer and the layer comprising the composition of claim 13.

* * * * *

UNITED STATES PATENT AND TRADEMARK OFFICE
CERTIFICATE OF CORRECTION

PATENT NO. : 10,858,516 B2
APPLICATION NO. : 16/643727
DATED : December 8, 2020
INVENTOR(S) : Jitendra Rathore et al.

Page 1 of 1

It is certified that error appears in the above-identified patent and that said Letters Patent is hereby corrected as shown below:

In the Specification

Column 1
Line 55, Delete "L'" and insert -- $L^1$ --, therefor.

Column 2
Line 58, Delete "of'" and insert -- of". --, therefor.

Column 5
Line 45, Delete "—NH—"" and insert -- —NH—, --, therefor.

Column 15
Line 7, Delete "Sigma-Idrich" and insert -- Sigma-Aldrich --, therefor.

In the Claims

Column 22
Line 30, In Claim 17, delete "CH$_2$" and insert -- —CH$_2$ --, therefor.
Line 65, In Claim 20, delete "claim 13." and insert -- claim 14. --, therefor.

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*